United States Patent
Burgess et al.

(10) Patent No.: US 10,369,555 B2
(45) Date of Patent: Aug. 6, 2019

(54) CATALYTIC WALL-FLOW FILTER WITH AN AMMONIA SLIP CATALYST

(71) Applicant: Johnson Matthey Public Limited Company, London (GB)

(72) Inventors: Garry Adam Burgess, Royston (GB); Guy Richard Chandler, Royston (GB); Keith Anthony Flanagan, Royston (GB); David Marvell, Royston (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/925,806

(22) Filed: Mar. 20, 2018

(65) Prior Publication Data
US 2018/0264446 A1   Sep. 20, 2018

Related U.S. Application Data

(60) Provisional application No. 62/473,521, filed on Mar. 20, 2017.

(51) Int. Cl.
*B01J 29/76*   (2006.01)
*B01J 35/04*   (2006.01)
(Continued)

(52) U.S. Cl.
CPC ........ *B01J 29/763* (2013.01); *B01D 53/9418* (2013.01); *B01D 53/9436* (2013.01);
(Continued)

(58) Field of Classification Search
CPC ............ B01D 46/0002; B01D 46/0027; B01D 46/0061; B01D 46/2414; B01D 46/2418; B01D 53/9418; B01D 53/9431; B01D 53/9436; B01D 53/9468; B01D 53/9472; B01D 2201/62; B01D 2239/0464;
(Continued)

(56) References Cited

U.S. PATENT DOCUMENTS 6,599,570 B1   7/2003   Aderhold et al.
7,247,184 B2   7/2007   Frost
(Continued)

FOREIGN PATENT DOCUMENTS

WO   2012135871 A1   10/2012
WO   2016160915 A1   10/2016
WO   2016160988 A1   10/2016

*Primary Examiner* — Timothy C Vanoy
(74) *Attorney, Agent, or Firm* — Gary D. Mangels

(57) ABSTRACT

A catalytic wall-flow monolith filter for use in an emission treatment system comprises a wall flow monolith comprising a porous substrate having surfaces that define the channels and having a first zone extending in the longitudinal direction from a first end face towards a second end face for a distance less than the filter length and a second zone extending in the longitudinal direction from the second end face towards the first end face and extending in the longitudinal direction for a distance less than the filter length, wherein a first SCR catalyst is distributed throughout the first zone of the porous substrate, an ammonia oxidation catalyst is distributed throughout the second zone of the porous substrate and a second SCR catalyst is located in a layer that covers the surfaces in the second zone of the porous substrate.

24 Claims, 5 Drawing Sheets

(51) Int. Cl.
| | |
|---|---|
| *B01J 35/00* | (2006.01) |
| *B01J 23/42* | (2006.01) |
| *B01J 23/888* | (2006.01) |
| *B01J 37/02* | (2006.01) |
| *B01D 53/94* | (2006.01) |
| *F01N 3/20* | (2006.01) |
| *F01N 3/022* | (2006.01) |
| *F01N 3/035* | (2006.01) |
| *F01N 3/28* | (2006.01) |
| *F01N 13/00* | (2010.01) |

(52) U.S. Cl.
CPC ..... *B01D 53/9468* (2013.01); *B01D 53/9472* (2013.01); *B01J 23/42* (2013.01); *B01J 23/888* (2013.01); *B01J 35/0006* (2013.01); *B01J 35/04* (2013.01); *B01J 37/024* (2013.01); *F01N 3/0222* (2013.01); *F01N 3/035* (2013.01); *F01N 3/2066* (2013.01); *F01N 3/28* (2013.01); *F01N 13/0093* (2014.06); *B01D 2255/1021* (2013.01); *B01D 2255/2092* (2013.01); *B01D 2255/20746* (2013.01); *B01D 2255/50* (2013.01); *B01D 2255/502* (2013.01); *B01D 2255/9022* (2013.01); *B01D 2255/9032* (2013.01); *B01D 2255/9035* (2013.01); *B01D 2255/9155* (2013.01); *F01N 2330/06* (2013.01); *F01N 2370/04* (2013.01); *F01N 2610/02* (2013.01)

(58) Field of Classification Search
CPC ...... B01D 2239/0478; B01D 2257/404; B01D 2258/01; B01D 2279/30; F01N 3/035; F01N 3/2066; F01N 2250/02; F01N 2230/30; F01N 2570/14
See application file for complete search history.

(56) References Cited

U.S. PATENT DOCUMENTS

| | | | |
|---|---|---|---|
| 7,393,511 | B2 | 7/2008 | Tran et al. |
| 7,410,626 | B2 | 8/2008 | Tran et al. |
| 7,985,391 | B2 | 7/2011 | Collier et al. |
| 8,202,481 | B2 | 6/2012 | Nochi et al. |
| 8,703,236 | B2 | 4/2014 | Chandler et al. |
| 8,883,100 | B2 | 11/2014 | Paulus et al. |
| 9,138,735 | B2 | 9/2015 | Roberts et al. |
| 9,937,489 | B2 | 4/2018 | Larsson |
| 2010/0111796 | A1 | 5/2010 | Caudle et al. |
| 2012/0186229 | A1* | 7/2012 | Phillips ............... B01D 53/9418 60/274 |
| 2012/0275977 | A1 | 11/2012 | Chandler et al. |
| 2014/0020364 | A1* | 1/2014 | Wittrock .................. F01N 3/10 60/274 |
| 2014/0227155 | A1* | 8/2014 | Phillips ............... B01D 53/9418 423/212 |
| 2016/0367974 | A1* | 12/2016 | Larsson ............... B01J 35/0006 |
| 2018/0111089 | A1* | 4/2018 | Li ...................... B01D 53/9418 |
| 2018/0283250 | A1* | 10/2018 | Chen ........................ B01J 21/08 |

* cited by examiner

A-A line cross-sectional view

Mixture = 2nd SCR Catalyst + NH₃ Oxidation Catalyst

Mixture = 2nd SCR Catalyst + NH₃ Oxidation Catalyst

CATALYTIC WALL-FLOW FILTER WITH AN AMMONIA SLIP CATALYST

FIELD OF THE INVENTION

The present invention relates to a catalytic wall-flow monolith comprising an SCR catalysts and an ammonia slip catalyst suitable for use in an emission treatment system, such as in mobile and stationary systems having internal combustion exhaust system.

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide). NOx is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Combustion of hydrocarbon-based fuel in engines and electrical power stations produces exhaust gas or flue that contains, in large part, relatively benign nitrogen ($N_2$), water vapor ($H_2O$), and carbon dioxide ($CO_2$). However, the exhaust and flue gases also contain, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust and flue gas released into the atmosphere, it is desirable to eliminate or reduce the amount of the undesirable components, preferably by a process that, in turn, does not generate other noxious or toxic substances.

Exhaust gas generated in lean-burn diesel engines is generally oxidative due to the high proportion of oxygen that is provided to ensure adequate combustion of the hydrocarbon fuel. NOx needs to be reduced selectively with a catalyst and a reductant in a process known as selective catalytic reduction (SCR) that converts NOx into elemental nitrogen ($N_2$) and water. This process can also form $N_2O$, a gas that is harmful to the ozone layer of the earth. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through and/or over the catalyzed substrate. In order to maximize the conversion of NOx, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore, the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

In exhaust gases from diesel engines, one of the most burdensome components to remove is $NO_x$. The reduction of $NO_x$ to $N_2$ is particularly problematic because the exhaust gas contains enough oxygen to favor oxidative reactions instead of reduction. Notwithstanding, $NO_x$ can be reduced by a process commonly known as Selective Catalytic Reduction (SCR). An SCR process involves the conversion of $NO_x$, in the presence of a catalyst and with the aid of a nitrogenous reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

Most SCR processes utilize a stoichiometric excess of ammonia in order to maximize the conversion of NOx. Unreacted ammonia that passes through the SCR process (also referred to as "ammonia slip") is undesirable, because the released ammonia gas can negatively impact the atmosphere and can react with other combustion species. To reduce ammonia slip, SCR systems can include an ammonia oxidation catalyst (AMOX) (also known as an ammonia slip catalyst (ASC)) downstream of the SCR catalyst.

Catalysts for oxidizing excess ammonia in an exhaust gas are known. For example, U.S. Pat. No. 7,393,511 describes an ammonia oxidation catalyst containing a precious metal, such as platinum, palladium, rhodium, or gold on a support of titania alumina, silica, zirconia, etc. Other ammonia oxidation catalysts contain a first layer of vanadium oxide, tungsten oxide, and molybdenum oxide on a titania support, and a second layer of platinum on a titania support (see, e.g., U.S. Pat. Nos. 7,410,626 and 8,202,481).

Accordingly, it is desirable to provide an improved catalysed wall-flow monolith that provides improved NOx conversion over a conventional SCRF/ASC on-wall design while achieving similar $NH_3$ conversion and reduced $N_2O$ formation. In would also be desirable to have an improved catalysed wall-flow monolith that provides improved NOx conversion across a wide temperature window, similar $NH_3$ conversion and decreased undesired $N_2O$ formation. The present invention satisfies these needs.

SUMMARY OF THE INVENTION

In a first aspect of the invention, a catalytic wall-flow monolith filter for use in an emission treatment system comprises a first end face, a second end face, a filter length defined by the distance from the first end face to the second end face, a longitudinal direction between the first end face and the second end face, and first and second pluralities of channels extending in the longitudinal direction, wherein the first plurality of channels is open at the first end face and closed at the second end face, and the second plurality of channels is open at the second end face and closed at the first end face, wherein the monolith filter comprises a porous substrate having surfaces that define the channels and having a first zone extending in the longitudinal direction from the first end face towards the second end face for a distance less than the filter length and a second zone extending in the longitudinal direction from the second end face towards the first end face and extending in the longitudinal direction for a distance less than the filter length, and wherein the first zone comprises a first SCR catalyst distributed throughout the porous substrate, and the second zone comprises an ammonia oxidation catalyst distributed throughout the porous substrate and a second SCR catalyst is located in a layer that covers the surfaces in the second zone of the porous substrate. The second SCR catalyst can be: (1) present only in the layer that covers the surfaces of the porous substrate (i.e. is not distributed throughout the porous substrate) in the second zone (on-wall), or (2) present in the layer that covers the surfaces of the porous substrate in the second zone (on-wall) and in substantially all or a portion of the porous substrate (e.g. in the wall) in the second zone (in-wall). When the second SCR catalyst is present in all or a portion of the porous substrate in the second zone, it can be present with all or a portion of the ammonia oxidation catalyst.

A second aspect of the invention relates to method for the manufacture of a catalytic wall-flow monolith filter, comprising:

(a) providing a porous substrate having a first end face and a second end face defining a longitudinal direction therebetween and first and second pluralities of channels extending in the longitudinal direction, wherein the first plurality of channels is open at the first end face and closed at the second end face, and wherein the second plurality of channels is open at the second end face and closed at the first end face;

(b) forming a first zone by selectively infiltrating the porous substrate with a washcoat comprising the first SCR catalyst, (c) forming the portion of the second zone comprising the ammonia oxidation catalyst by selectively infiltrating the porous substrate with a washcoat comprising an ammonia oxidation catalyst, (c) forming a coating of a second SCR catalyst over the ammonia oxidation catalyst in the second zone, where the walls of the second plurality of channels are covered by the coating, wherein step (b) can be performed before step (c) or step (c) can be performed before step (b).

A third aspect of the invention relates to a method of treating an exhaust gas comprising contact an exhaust gas comprising NOx and ammonia with a catalytic wall-flow monolith filter of the first aspect of the invention.

BRIEF DESCRIPTION OF THE DRAWINGS

The invention will now be described in relation to the following non-limiting figures.

DETAILED DESCRIPTION OF THE INVENTION

Figure 1:
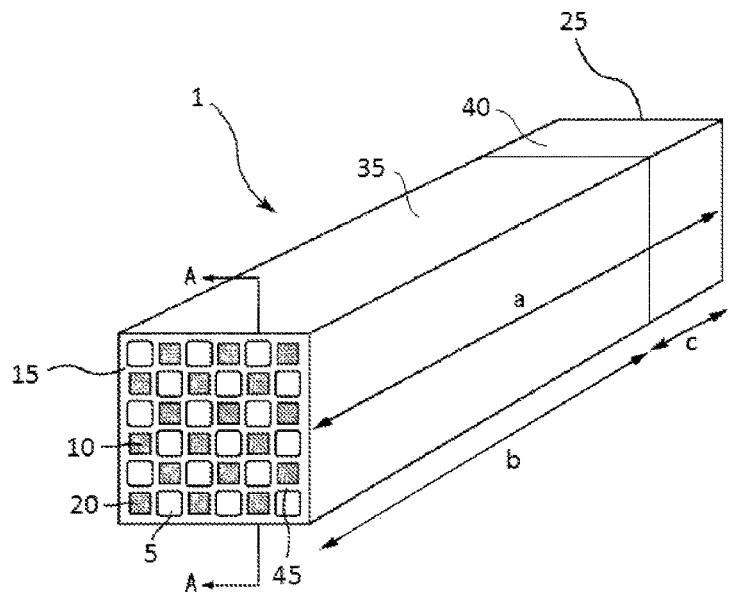
FIG. 1 is a perspective view that schematically shows a wall flow monolith filter 1 according to one aspect of the present invention.

The present invention will now be further described. In the following passages different aspects of the invention are defined in more detail. Each aspect so defined can be combined with any other aspect or aspects unless clearly indicated to the contrary. In particular, any feature indicated as being preferred or advantageous can be combined with any other feature or features indicated as being preferred or advantageous.

The present invention relates to a catalytic wall-flow monolith filter comprising an ammonia slip catalyst for use in an emission treatment system. Wall-flow monoliths are well-known in the art for use in diesel particulate filters. They work by forcing a flow of exhaust gases (including particulate matter) to pass through walls formed of a porous material.

The wall-flow monolith has a first end face, which is the inlet for exhaust gases, a second end face, which is an outlet for the exhaust gas, defining a longitudinal direction therebetween.

A wall-flow monolithic filter comprises many parallel channels separated by thin walls that run axially through the monolith and are coated with one or more catalysts. The term "walls" means the physical structure of the substrate that forms the channels. The term "channel" means a space formed by walls in the substrate. The cross section of the channels can be round, oval or polygonal (triangular, square, rectangular, hexagonal or trapazoidal). The structure is reminiscent of a honeycomb.

A wall-flow monolith has first and second pluralities of channels extending in the longitudinal direction. The first plurality of channels is open at the first end face and closed at the second end face. The second plurality of channels is open at the second end face and closed at the first end face. The channels are preferably parallel to each other and provide a relatively constant wall thickness between the channels. As a result, gases entering one of the plurality of channels cannot leave the monolith without diffusing through the channel walls into the other plurality of channels. The channels are closed with the introduction of a sealant material into the open end of a channel. Preferably the number of channels in the first plurality is equal to the number of channels in the second plurality, and each plurality is evenly distributed throughout the monolith.

The wall-flow monolith comprises a number of cells. The term "cell" means a channel surrounded by one or more walls. The number of cells per unit cross-sectional area is the cell density". Preferably the mean cross-sectional width of the first and second pluralities of channels, in combination with the porous walls, results in a cell density of 100 to 600, preferably 200 to 400, cells per square inch (cpsi) (15.5 to 93 cells per square cm (cpscm), preferably 31 to 64 cpscm). The channels can be of a constant width and each plurality of channels can have a uniform channel width. Preferably, however, the plurality of channels that serves as the inlet in use has a greater mean cross-sectional width than the plurality of channels that serves as the outlet. Preferably, the difference is at least 10%. This affords an increased ash storage capacity in the filter, meaning that a lower regeneration frequency can be used. Asymmetric filters are described in U.S. Pat. No. 7,247,184, which is incorporated herein by reference.

Preferably the mean minimum thickness of the substrate between adjacent channels (i.e., wall thickness) is from 6 to 20 mil, inclusive (where a "mil" is 1/1000 inch) (0.015 to 0.05 cm). Since the channels are preferably parallel and preferably have a constant width, the minimum wall thickness between adjacent channels is preferably constant. As will be appreciated, it is necessary to measure the mean minimum distance to ensure a reproducible measurement. For example, if the channels have a circular cross-section and are closely packed, then there is at least one point where the wall is thinnest between two adjacent channels. The wall thickness is preferably associated with the wall porosity and/or mean pore size. For example, the wall thickness can be between 10 and 50 times the mean pore size.

In order to facilitate the passage of gases to be treated through the channel walls, the monolith is formed out of a porous substrate. The substrate can also act as a support for holding catalytic material. Suitable materials for forming the porous substrate include ceramic-like materials such as cordierite, α-alumina, silicon carbide, silicon nitride, zirconia, mullite, spodumene, alumina-silica-magnesia or zirconium silicate, or porous, refractory metal. Wall-flow substrates can also be formed of ceramic fiber composite materials. Preferred wall-flow substrates are formed from cordierite and silicon carbide. Such materials are able to withstand the environment, particularly the high temperatures, encountered in treating the exhaust streams and can be made sufficiently porous. Such materials and their use in the manufacture of porous monolith substrates is well known in the art.

Preferably the monolith filter is porous and can have a porosity of 40 to 75%. Suitable techniques for determining porosity are known in the art and include mercury porosimetry and x-ray tomography.

Preferably the coated porous substrate has a porosity of about 25 to 50% and the catalyst surface coating has a porosity of 25 to 75%. The porosity of the catalyst coating can be higher than the porosity of the coated porous substrate or the coated porous substrate can have a higher porosity relative to the porosity of the catalyst coating.

The wall-flow monolith filter comprises at least two SCR catalysts and an ammonia oxidation catalyst. A catalyst is generally applied to a wall-flow monolith filter as a catalytic material. The term "catalytic material" means a combination of a catalyst with one or more non-catalytic materials, such as supports, binders, rheology modifiers, promoters, stabilizers, etc.

SCR Catalysts

The SCR catalysts can be an oxide of a base metal, a molecular sieve, a metal exchanged molecular sieve or a mixture thereof. The base metal can be selected from the group consisting of cerium (Ce), chromium (Cr), cobalt (Co), copper (Cu), iron (Fe), manganese (Mn), molybdenum (Mo), nickel (Ni), tungsten (W), vanadium (V), and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, of which the entire contents are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from barium (Ba), calcium (Ca), cerium (Ce), lanthanum (La), magnesium (Mg), manganese (Mn), molybdenum (Mo), neodymium (Nd), niobium (Nb), praseodymium (Pr), strontium (Sr), tantalum (Ta), tantalum (Ta), tin (Sn), zinc (Zn), zirconium (Zr), and oxides thereof. The at least one base metal catalyst promoter can preferably be $CeO_2$, CoO, CuO, $Fe_2O_3$, $MnO_2$, $Mn_2O_3$, $SnO_2$, and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat. The SCR catalyst can contain from at least about 0.1 weight percent, at least about 0.5 weight percent, at least about 1 weight percent, or at least about 2 weight percent to at most about 10 weight percent, about 7 weight percent, about 5 weight percent of a promoter metal based on the total weight of the promoter metal and support.

The SCR catalyst can comprise a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, BEA, FAU, LTA, MFI, and MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

As used herein, the term "non zeolitic molecular sieve" refers to corner sharing tetrahedral frameworks where at least a portion of the tetrahedral sites are occupied by an element other than silicon or aluminum. Specific non-limiting examples of non-zeolitic molecular sieves include silicoaluminophosphates such as SAPO-34, SAPO-37 and SAPO-44. The silicoaluminophosphates can have framework structures that contain framework elements that are found in zeolites, such as BEA, CHA, FAU, LTA, MFI, MOR and other types described below.

The SCR catalyst can comprise a small pore, a medium pore or a large pore molecular sieve, or combinations thereof.

The SCR catalyst can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof. The SCR catalyst can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, LTA, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably the small pore molecular sieve is selected from the group of Framework Types consisting of AEI, AFX, CHA, DDR, ERI, ITE, KFI, LTA, LEV, and SFW.

The SCR catalyst comprises can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of FER, MFI, and STT.

The SCR catalyst can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of BEA, MOR and OFF.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zerovalent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper ammines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve.

A metal exchanged molecular sieve can contain in the range of about 0.10% and about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) supported small pore molecular sieve having from about 0.1 to about 20.0 wt. % copper of the total weight of the catalyst. Preferably copper is present from a about 1 wt. % to about 6 wt. % of the total weight of the catalyst, more preferably from about 1.8 wt. % to about 4.2 wt. % of the total weight of the catalyst.

The metal exchanged molecular sieve can be an iron (Fe) supported small pore molecular sieve having from about 0.1 to about 20.0 wt. % iron of the total weight of the catalyst. Preferably iron is present from about 1 wt. % to about 6 wt. % of the total weight of the catalyst, more preferably from about 1.8 wt. % to about 4.2 wt. % of the total weight of the catalyst.

The metal exchanged molecular sieve can be a manganese (Mn) supported small pore molecular sieve having from about 0.1 to about 20.0 wt. % manganese of the total weight of the catalyst. Preferably manganese is present from about 1 wt. % to about 6 wt. % of the total weight of the catalyst, more preferably from about 1.8 wt. % to about 4.2 wt. % of the total weight of the catalyst.

Oxidation Catalyst

The oxidation catalyst can comprise a noble metal or mixtures thereof. Preferably, the noble metal is gold, silver, platinum, palladium, ruthenium or rhodium, or combinations thereof. More preferably the noble metal is platinum or palladium or a combination of platinum and palladium.

A noble metal is preferably disposed on a refractory metal oxide support.

The platinum group metal can be present in an amount from about 0.1 g/ft$^3$ to about 75 g/ft$^3$, preferably from about 2 g/ft$^3$ to about 50 g/ft$^3$, more preferably from about 5 g/ft$^3$ to about 30 g/ft$^3$.

The ammonia oxidation catalyst can comprise platinum, palladium or a combination of platinum and palladium on a support with low ammonia storage. The term "a support with low ammonia storage" means a support that stores less than 0.001 mmol $NH_3$ per m$^3$ of support. The support with low ammonia storage is preferably a molecular sieve or zeolite having a framework type selected from the group consisting of AEI, ANA, ATS, BEA, CDO, CFI, CHA, CON, DDR, ERI, FAU, FER, GON, IFR, IFW, IFY, IHW, IMF, IRN, IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, SSO, SSY, STF, STO, STT, SVR, SVV, TON, TUN, UOS, UOV, UTL, UWY, VET, VNI. More preferably, the support with low ammonia storage is a molecular sieve or zeolite having a framework type selected from the group consisting of BEA, CDO, CON, FAU, MEL, MFI and MWW, even more preferably the framework type is selected from the group consisting of BEA and MFI.

A layer comprising an oxidation catalyst can further comprise an oxide support material comprising alumina ($Al_2O_3$), silica ($SiO_2$) zirconia ($ZrO_2$), ceria ($CeO_2$) and titania ($TiO_2$), or mixtures thereof. The oxide support material can further comprise other oxide materials such as perovskites, nickel oxide (NiO), manganese dioxide ($MnO_2$), praseodymium (III) oxide ($Pr_2O_3$). The oxide support material can include composite oxides or mixed oxides of two or more thereof (such as $CeZrO_2$ mixed oxides, $TiZrO_2$ mixed oxides, $TiSiO_2$ mixed oxides, and $TiAlO_x$ oxides where x is dependent on the ratio of $TiO_2$ to $Al_2O_3$.). The oxide support material, in addition for serving as a support may also serve as a binder. For example, alumina may act as both a support and a binder in an alumina and $CeZrO_2$ mixed oxide. The second layer can comprise an oxide support material comprising one or more of a stabilized alumina, ceria, silica, titania and zirconia. Stabilizers may be selected from zirconium (Zr), lanthanum (La), aluminum (Al), yttrium (Y), praseodymium (Pr), neodymium (Nd), an oxide thereof, a composite oxide or mixed oxide of any two or more thereof, or at least one alkaline earth metal, e.g., barium (Ba), calcium (Ca), magnesium (Mg) and strontium (Sr). If each oxide support material is stabilized, the stabilizers may be the same or different. The oxide support material can be $Al_2O_3$ and $CeO_2$. Where the oxide support material is $Al_2O_3$, it may be alpha-, gamma-, beta-, delta-, or theta-$Al_2O_3$, for example. The support material can be in the form of mixed oxides or stabilized mixed oxides. The metal oxides in mixed oxides are present in the form of a single phase, while stabilized mixed oxides are present in two phases. Preferably a layer comprising the oxidation catalyst comprises Cu and Mn, as the first and second metals, alumina and either $CeO_2/ZrO_2$ or a Zr-stabilized $CeO_2$ mixed oxide. The Zr-stabilized $CeO_2$ mixed oxide can comprise Ce and Zr in about a 1:1 mole ratio. The oxide support material can be La-stabilized $Al_2O_3$ and Zr-stabilized $CeO_2$. The oxide support material in the second layer can comprise about 20 mole % La-stabilized $Al_2O_3$ and about 80 mole % Zr-stabilized $CeO_2$.

The wall-flow monolith filter of the present invention has been treated with a first SCR catalyst to have a first zone extending in the longitudinal direction from the first end face and with an ammonia oxidation catalyst and a second SCR catalyst to form a second zone extending in the longitudinal direction from the second end face towards the first zone. In other words, one end of the monolith (relative to the flow of exhaust gases) forms the first zone and the remainder of the monolith at the other end forms the second zone. The first and second zones can preferably meet at a border that is preferably in a plane approximately parallel to the first and second end faces. This facilitates the wash-coating process. However, it is also possible to have a border which varies across the cross-section of the monolith, such as a cone-shaped border. This can advantageously be used to increase the volume of the second zone within the monolith, since a central area of the monolith can experience elevated temperatures.

The wall-flow monolith filter can further comprise a gap between at least a portion of the first zone and the second zone. Preferably there is no gap between at least a portion of the first zone and the second zone.

In order to provide a catalytic wall-flow monolith of the present invention, catalytic material is applied to the porous substrate, typically in the form of a washcoat. The application can be characterised as "in wall" application or "on wall" application. "In-wall" means that the catalytic material is present in the pores within the porous material. "On wall" means the catalyst material is present as a catalyst coating on the walls of the channels. The term "catalyst coating" means a catalytic material that is present on the walls of a monolith filter in a thickness of about 0.1 to 15% of the thickness of the wall upon which the coating is disposed. Some of the catalytic material in an on-wall application can be present in-wall. In some configurations, the second SCR catalyst in the second zone can be present both "on-wall" and a coating and "in-wall." The amounts of the second SCR catalyst present in-wall are described herein.

The techniques for "in wall" or "on wall" application can depend on the viscosity of the material applied, the application technique (spraying or dipping, for example) and the presence of different solvents. Such application techniques are known in the art. The viscosity of the washcoat is influenced, for example, by its solids content. It is also influenced by the particle size distribution of the washcoat—a relatively flat distribution will give a different viscosity to a finely milled washcoat with a sharp peak in its particle size distribution—and rheology modifiers such as guar gums and other gums. Suitable coating methods are described in U.S. Pat. Nos. 6,599,570, 8,703,236 and 9,138,735, which are incorporated herein by reference.

It is possible using conventional techniques to provide different zones within the substrate having different distributions of catalytic material. For example, where "on wall" application to a specific zone of the substrate is desired, a protective polymeric coating (such as polyvinyl acetate) can be applied to the remaining zone so that the catalyst coating does not form there. Once the residual washcoat has been removed, for example under vacuum, the protective polymeric coating can be burnt off.

The first zone comprises a first SCR catalyst distributed throughout the porous substrate. Examples of the first SCR catalyst are discussed above. "Distributed throughout the porous substrate" means that the material is found within the porous substrate. A majority of the pores can contain the first SCR catalyst. This can be visually observed, for example using microscopy or various other techniques described below, depending upon the catalyst.

In the first zone, preferably the first plurality of channels is free from catalytic material on the surface thereof. The term "free from catalytic material on the surface" means there is no visual appearance of catalytic material, there is no catalytic material detected on the walls of the channel, or any catalytic material detected on the walls of the channel is present at a concentration that does not have an impact on the overall catalytic activity of the monolith filter. Preferably the second plurality of channels is free from catalytic material on the surface thereof. More preferably both the first and second plurality of channels is free from catalytic material on the surface thereof.

The first SCR catalyst can be placed in the pores of the substrate, such as by infiltration with a washcoating method. This process coats the pores and holds catalytic material therein, while maintaining sufficient porosity for the gases to penetrate through the channel walls The second zone has an oxidation catalyst distributed throughout the porous substrate and a second SCR catalyst as a coating on the walls of the substrate. In the second zone, the majority of the pores contain the ammonia oxidation catalyst. The first SCR catalyst and the ammonia oxidation catalyst in the first zone and the second zone, respectively, are substantially within the walls of the filter and not on the surface of the walls.

The second SCR catalyst is located in a layer that covers the surfaces in the second zone of the porous substrate. The second SCR catalyst can be: (1) present only in the layer that covers the surfaces of the porous substrate (i.e. is not distributed throughout the porous substrate) in the second zone (on-wall), or (2) present in the layer that covers the surfaces of the porous substrate in the second zone (on-wall) and in substantially all or a portion of the porous substrate (e.g. in the wall) in the second zone (in-wall). The term "substantially all of the porous substrate in the second zone" means that at least about 70%, at least about 75%, at least about 80%, at least about 85%, at least about 90%, or at least about 95%, of the porous substrate contains the second SCR catalyst in the wall of the substrate. The term "a portion of the porous substrate in the second zone" means that less than about 70%, less than about 65%, less than about 60%, less than about 55%, less than about 70%, less than about 65%, less than about 60%, less than about 55%, less than about 50%, less than about 45%, less than about 40%, less than about 35%, less than about 25%, less than about 20%, less than about 15%, less than about 10%, or less than about 5% of the porous substrate contains the second SCR catalyst in the wall of the substrate.

In one configuration, the second SCR catalyst in the second zone is not distributed throughout the porous substrate. The term "not distributed throughout the porous substrate" means that the material is either only present on the walls of the substrate or the material is present with the majority of the material on the walls of the porous substrate and the remainder of the material in located within a portion, but not all of, the porous substrate associated with the second zone. The term "portion of the substrate" means a part of, but not all of the substrate.

Preferably the catalytic material coating the channels of the second zone penetrates to one or more of <25%, <20%, <15%, <10%, and <5% of the thickness of the channel wall.

The catalytic wall-flow monolith filter can have the second SCR catalyst present in the layer that covers the surfaces of the porous substrate in the second zone and in all of the porous substrate in the second zone.

The catalytic wall-flow monolith filter can have the second SCR catalyst is present in the layer that covers the surfaces in the second zone of the porous substrate and in a portion of the porous substrate in the second zone.

When the second SCR catalyst is present in all or a portion of the porous substrate in the second zone, it can be present with all or a portion of the ammonia oxidation catalyst.

In the second zone, in one configuration, the second SCR catalyst can be substantially on the walls and not in the walls. The term "substantially on the walls and not in the walls" means that majority, preferably at least 75%, 80%, 85%, 90%, or 95%, of the material is present on the walls of the monolith in the second zone. This can be determined, for example by scanning electron microscopy (SEM). When the catalyst comprises a metal, such as copper, (electron probe micro-analysis) EPMA can be used to determine the distribution of the metal in and on the walls. These catalysts can also be observed, for example using microscopy, by the absence of washcoat in the walls of the substrate.

In a configuration, the catalytic material in the second zone can extend into pores close to the surface of the substrate in the second zone and be present in a portion of the substrate near the coating. This may be necessary for the coating to adhere to the substrate.

In the second zone, an oxidation catalyst is present in the walls of the filter and a second SCR catalyst is present as a coating covering the walls of the second plurality of channels (outlet side of the porous wall). The oxidation catalyst can be applied to the monolith from the second end face using any technique that can be used to place the first SCR catalyst in the walls of the filter. The catalyst coating comprising the second SCR catalyst can have an average thickness of about 0.1 to 15% of the thickness of the wall upon which the coating is disposed. This thickness does not include any depth associated with penetration into the pores. The catalytic material comprising the second SCR catalyst can cover the channel walls of the second plurality of channels from the second end face as a coating on the wall. The coating on the wall can have a thickness of 10 μm to 80 μm, preferably from 15 to 60 μm, more preferably 15 to 50 μm, inclusive.

The second zone can cover about 10 to about 50% of the filter length, measured from the second end face. For example, the second zone can cover 10-45%, 10-40%, 10-35%, 10-25%, 10-20%, or 10-15% of the filter length. Preferably, the second zone covers 10-25%, 25-50%, more preferably 10-25%, of the filter length. The coating of the second SCR catalyst in the second zone can also comprise a catalyst concentration gradient with the high concentration of the second SCR catalyst being toward the inlet end of the filter.

The catalytic wall-flow monolith filter can have a ratio of a length of the second zone to a length of the first zone in the longitudinal direction from 1:10 to 1:1, preferably 1:10 to 1:2, more preferably 1:10 to 1:4, even more preferably 1:10 to 1:5.

The size of the particles of the catalyst material can be chosen to limit their movement into the substrate. On skilled in the art would recognize that this size is dependent upon the pores sizes of the monolith filter before treatment.

The coating of the second SCR catalyst over the ammonia oxidation catalyst can be applied as a catalyst washcoat that contains the second SCR catalyst and optionally one or more other constituents such as binders (e.g., metal oxide particles), fibers (e.g., glass or ceramic non-woven fibers), masking agents, rheology modifiers, and pore formers.

The catalyst material can be deposited as a layer on the walls of the channels. This can be performed by any one of a variety of techniques known in the art, such as spraying or dipping. The catalytic material can be substantially prevented from infiltrating the porous substrate by one of several techniques, such as using a thick and viscous coating solution as described above. In configurations where some of the second SCR catalysts is found in the porous substrate, the particle size distribution of the second SCR catalyst can be broader and encompass a larger amount of smaller size particles that are used when the second SCR catalyst is present only as a coating on the surface of the porous substrate. One skilled in the art would recognize that changes to the washcoat, such as a thinned solution, could allow for increased penetration into the walls.

The first SCR catalyst, distributed throughout the first zone of the porous substrate, can be the same as the second SCR catalyst covering the surface of the second plurality of channels.

Alternatively, the first SCR catalyst, distributed throughout the first zone of the porous substrate can be different than the second SCR catalyst covering the surface of the second plurality of channels.

Preferably the catalytic material distributed throughout the first zone of porous substrate comprises a small-pore zeolite. Small pore zeolites with particular application for treating $NO_x$ in exhaust gases of lean-burn combustion engines include zeolites selected from the AEI, AFT, AFX, CHA, DDR, EAB, ERI, GIS, GOO, KFI, LEV, LTA, MER, PAU, SFW, VNI and YUG structural families. Suitable examples are described in U.S. Pat. No. 8,603,432, which is incorporated herein by reference. Small pore zeolites from the AEI, CHA and LTA families are especially preferred. The small pore zeolite preferably comprises one or more of Cu, Fe and Mn. The small pore zeolite can comprise one or more precious metals (gold, silver and platinum-group-metals), preferably with platinum-group-metals, more preferably palladium or platinum, and most preferably palladium. The catalytic material can further comprise Ce.

The first SCR catalyst can preferably comprise a catalyst with a fast transient response, such as a catalyst that does not contain vanadium and does not contain a zeolite, or a zeolite or a metal containing zeolite, such as Cu/beta.

Preferably, the more durable catalyst, such as a copper-containing small pore zeolite, is located on the downstream portion of the wall flow monolith.

Preferably, the second SCR catalyst, the on-wall catalyst located on the downstream (rear) section of the wall flow monolith, has a higher thermal stability than the first SCR catalyst.

Preferably the catalytic material distributed throughout the first zone of the porous substrate and the catalytic material covering the surface of the second plurality of channels are independently selected from copper, iron or manganese containing zeolites, such as AEI, AFX, BEA, CHA and LTA.

A catalytic wall-flow monolith filter can further comprise a third zone located between the first zone and the second zone, wherein the third zone comprises the first SCR catalyst distributed throughout the porous substrate and the second SCR catalyst located in a layer that covers the surface of the porous substrate and is not distributed throughout the porous substrate.

The third zone can have a length up to 10%, preferably up to 5%, of the length of the monolith substrate.

A catalytic wall-flow monolith filter can further comprise a gap between at least a portion of: (a) the first zone and the second zone; (b) the first zone and the third zone; or (c) the third zone and the second zone.

A catalytic wall-flow monolith filter can have no gap between at least a portion of: (a) the first zone and the second zone; (b) the first zone and the third zone; or (c) the third zone and the second zone.

One of the difficulties in treating $NO_x$ in an exhaust gas is that the quantity of $NO_x$ present in the exhaust gas is transient, i.e. it varies with driving conditions, such as acceleration, deceleration and cruising at various speeds. In order to overcome this problem, SCR catalysts can adsorb (or store) nitrogenous reductant such as ammonia, thus providing a buffer to the appropriate supply of available reductant. Molecular sieve-based catalysts such as those described above can store ammonia, and the catalyst activity at the onset of exposure of the catalyst to $NH_3$ can be substantially lower than the activity when the catalyst has a relatively high exposure or saturated exposure to $NH_3$. For practical vehicle applications, this means the catalyst needs to be pre-loaded with an appropriate $NH_3$ loading to ensure good activity. However, this requirement presents some significant problems. In particular, for some operating conditions, it is not possible to achieve the required $NH_3$ loading; and this pre-loading method has limitations because it is not possible to know what the engine operating conditions will be subsequent to pre-loading. For example, if the catalyst is pre-loaded with $NH_3$ but the subsequent engine load is at idle, $NH_3$ can be slipped to atmosphere. The rate of increase of activity of the SCR catalyst from zero ammonia exposure to saturated ammonia exposure is referred to as the "transient response". In this regard, it is preferable that the second SCR catalyst covering the surface of the second plurality of channels is a large-pore zeolite, preferably a copper beta zeolite. Alternatively, other, non-zeolite, catalytic materials can be used such as $CeO_2$ impregnated with W, $CeZrO_2$ impregnated with W, or $ZrO_2$ impregnated with Fe and W. Other suitable catalysts are known in the art and are described in U.S. Pat. No. 7,985,391 and U.S. Published Patent Application No. 2012275977, which are incorporated herein by reference. Using such large-pore zeolites or non-zeolite materials as a coating is advantageous because these materials generally provide a faster transient SCR response than the small-pore zeolites described above, since they require significantly less pre-loaded ammonia to function effectively. In other words, they have high activity at lower $NH_3$ exposures (low exposure relative to the saturated storage capacity of the catalyst) compared to the small pore zeolites). There can be a synergistic relationship between the small pore zeolites described above and the large-pore zeolites and non-zeolite materials described presently.

In another aspect, there is provided an emission treatment system for treating a flow of a combustion exhaust gas, the system comprising the catalytic wall-flow monolith as described in the first aspect of the invention.

The catalytic wall flow monolith filters described herein are beneficial for a number of reasons. Conventional ASC coatings on SCRF's minimise ASC coating penetration into the porous wall of the DPF to ≤30%. By locating the oxidation component in the porous wall of the filter, NOx conversion is improved over a conventional SCRF/ASC on-wall design while obtaining similar $NH_3$ conversion and reduced $N_2O$ formation.

The filters described herein allow NOx still present in exhaust gas after exiting the first zone, comprising the first SCR catalyst, via the downstream wall flow filter channels to be able to contact the second SCR catalyst in the on-wall coating. This can provide better contact/accessibility between the reactants and the active catalytic component sites than the configuration where the SCR catalyst is only present in-wall and some of the exhaust gas can by-pass the first zone. This configuration can provide NOx conversion in relatively high flow rate applications; or allow for shorter/less volume substrates that are cheaper to manufacture, potentially lighter (less weight benefit fuel economy and so reduces $CO_2$ emissions), less problematic to packaging (canning) and easier to find space for on the vehicle. Filters with the configuration described herein can allow for increased gas/catalyst contact because exhaust gas would be able to further contact the second SCR in the coating.

According to a further aspect there is provided a method for the manufacture of a catalytic wall-flow monolith, comprising:

(a) providing a porous substrate having a first end face and a second end face defining a longitudinal direction therebetween and first and second pluralities of channels extending in the longitudinal direction, wherein the first plurality of channels is open at the first end face and closed at the second end face, and wherein the second plurality of channels is open at the second end face and closed at the first end face;

(b) forming a first zone by selectively infiltrating the porous substrate with a washcoat comprising the first SCR catalyst, (c) forming the portion of the second zone comprising the ammonia oxidation catalyst by selectively infiltrating the porous substrate with a washcoat comprising an ammonia oxidation catalyst, (d) forming a coating of a second SCR catalyst over the ammonia oxidation catalyst in the second zone, where the walls of the second plurality of channels are covered by the coating, wherein step (b) can be performed before step (c) or step (c) can be performed before step (b).

Selective infiltration of the substrate by the washcoat can be performed by immersing the substrate vertically in a catalyst slurry such that the desired boundary between the first and second substrate zones is at the surface of the slurry. The substrate can be left in the slurry for a sufficient period of time to allow the desired amount of the slurry to move into the substrate. The period of time should be less than 1 one minute, preferably about 30 seconds. The substrate is removed from the slurry, and excess slurry is removed from the wall-flow substrate first by allowing it to drain from the channels of the substrate, then by blowing on the slurry on the substrate with compressed air (against the direction of slurry penetration), and then pulling a vacuum from the direction of slurry penetration. By using this technique, the catalyst slurry permeates the walls of the first zone of the substrate, yet the pores are not occluded to the extent that back pressure will build up in the finished substrate to unacceptable levels. One skilled in the art would recognize the unacceptable levels for the back pressure depend upon a variety of factors including the size of the engine to which the filter is connected, the conditions under which the engine is run and the frequency and method of regenerating the filter.

One skilled in the art would recognize that various factors including, but not limited to, particle size distribution, viscosity of the washcoat and the presence of other non-catalytic materials, such as as supports, binders, rheology modifiers, promoters, stabilizers, etc. can be adjusted to control the amount of the second SCR catalyst that can be move into the porous walls.

The coated substrates are dried typically at about 100° C. and calcined at a higher temperature (e.g. 300 to 450° C.).

After calcining, the washcoat loading can be determined from the coated and uncoated weights of the substrate. The catalyst loading can be determined from the washcoat loading based on the amount of catalyst in the washcoat. As will be apparent to those of skill in the art, the washcoat loading can be modified by altering the solids content of the coating slurry. Alternatively, repeated immersions of the substrate in the coating slurry can be conducted, followed by removal of the excess slurry as described above.

Methods of forming the coating of the second catalytic material are known in the art and are described in U.S. Pat. Nos. 6,599,570, 8,703,236 and 9,138,735, which are incorporated herein by reference. To prevent coating of the second catalytic material from forming in the first zone of the substrate, the surface in the first zone can be pre-coated with a protective polymeric film, such as polyvinyl acetate. This prevents the catalytic material from adhering to the surface of the substrate in the first zone. The protective polymeric coating can then be burnt off.

Preferably the catalytic wall-flow monolith manufactured according to the foregoing method is a monolith of the first aspect of the invention as described herein. That is, all features of the first aspect of the invention can be freely combined with the further aspects described herein.

According to a further aspect of the invention, provided is a method for treating a flow of a combustion exhaust gas comprising $NO_x$ and particulate matter, the method comprising passing the exhaust stream through the monolith of the first aspect of the invention.

The exhaust systems of the present invention are for use in internal combustion engines and in particular to lean-burn internal combustion engines, especially diesel engines.

Figure 3:
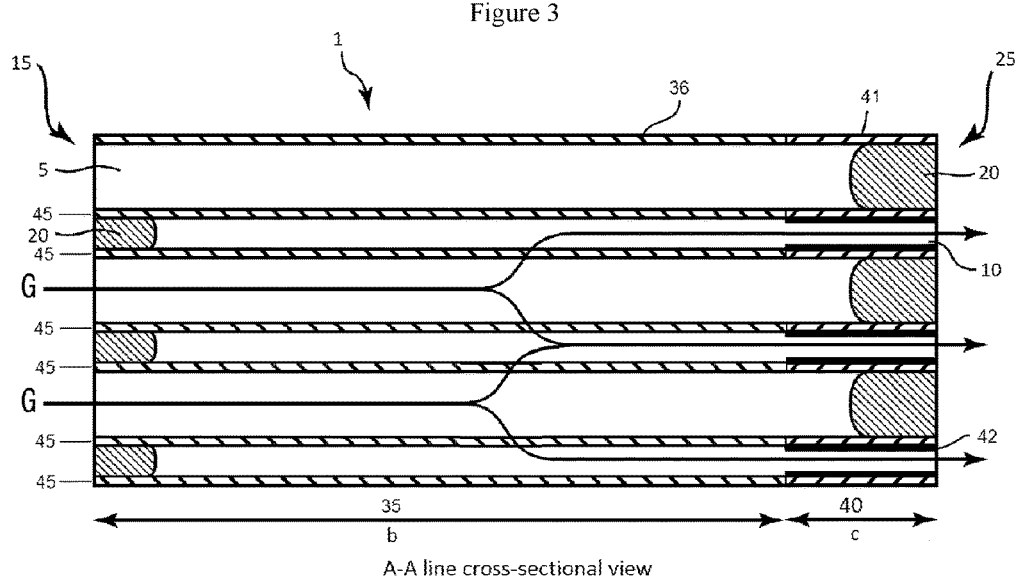
FIG. 3 is a cross-sectional view of the wall flow monolith filter shown through plane A-A in FIG. 1 where the catalysts are located in the configuration shown in FIG. 2.
Figure 4:
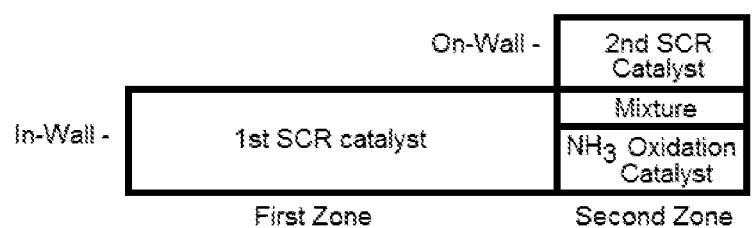
FIG. 4 is a schematic diagram showing the location of the two SCR catalysts and an ammonia oxidation catalyst in a configuration of the invention where the second SCR catalyst is present in a coating over the ammonia oxidation catalyst in the second zone and in a portion of the substrate in the second zone with a portion of the ammonia oxidation catalyst.

FIGS. 1, 3 and 4 show various features of aspects of the invention. Below is an index with the name of the feature and the corresponding identifier in these figures.

| | |
|---|---|
| wall flow monolith | 1 |
| first subset of channels | 5 |
| second subset of channels | 10 |
| first end face | 15 |
| sealing material | 20 |
| second end face | 25 |
| first zone | 35 |
| first SCR catalyst | 36 |
| second zone | 40 |
| oxidation catalyst | 41 |
| second SCR catalyst | 42 |
| channel wall | 45 |
| exhaust gas treatment system | 100 |
| ammonia reductant | 105 |
| flow of exhaust gas | 110 |
| engine | 115 |
| ducting | 120 |
| wall flow filter of first aspect of the invention | 125 |
| catalyst before wall flow filter of first aspect of the invention | 127 |
| reservoir | 130 |
| controller | 135 |
| injection nozzle | 140 |
| monolith length | a |
| length of first zone | b |
| length of second zone | c |
| cross sectional plane | A-A |
| exhaust gas | G |

A wall flow monolith 1 according to the present invention is shown in FIGS. 1 and 3. The monolith comprises a large number of channels 5, 10 arranged in parallel with each other in the longitudinal direction (shown by a double-sided arrow "a" in FIG. 1) of the monolith 1. The large number of channels has a first subset of channels 5 and a second subset of channels 10. The monolith filter is composed of a porous material.

FIG. 1 shows the monolith filter 1 with the first edge face 15 towards the front where exhaust gas enters the monolith filter 1 through a first subset of channels 5 that are open at the first end face 15 and sealed at the second end face 25. The second subset of channels 10 is sealed at the first end face 15 with sealing material 20 and have open ends at the second end face 25. The filter monolith has a total length a and comprises a first zone 35 having a length b and a second zone 40 having a length c. FIG. 1 also shows a plain A-A passing through the monolith filter.

A first zone 35 of the wall flow monolith 1 extends a distance b from the first end face 15 and is provided with a first SCR catalyst within pores of the channels walls 45. This can be provided using a washcoat application method, as is known in the art and is discussed elsewhere in the specification.

A second zone 40 of the wall flow monolith 1 extends a distance c from the second end face 25 towards the first end face 15 and meets the first zone 35. The second zone 40 is provided with an ammonia oxidation catalyst 41 within pores of the channels walls 45. A surface coating comprising a second SCR catalyst 42, such as a zeolite (not necessarily, but preferably, the same as the first SCR catalyst 36, can be applied to the surface of the channel walls 45 within the second zone 54. The closed channel walls, not shown, within the second zone 40 are preferably not surface coated.

Figure 2:
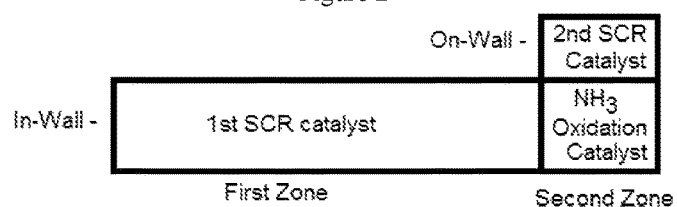
FIG. 2 is a schematic diagram showing the location of the two SCR catalysts and an ammonia oxidation catalyst in a configuration of the invention where the second SCR catalyst is only present in a coating over the ammonia oxidation catalyst in the second zone.

FIG. 2 is a schematic diagram showing the location of the two SCR catalysts and an ammonia oxidation catalyst in a configuration of the invention where the second SCR catalyst is only present in a coating over the ammonia oxidation catalyst in the second zone. The first zone comprises a first SCR catalyst located within the wall of the filter. The second zone, located downstream of the first zone, comprises an ammonia oxidation catalyst within the wall of the filter and a second SCR catalyst on the wall of the filter. The second SCR catalyst is not distributed throughout all of the porous substrate. One skilled in the art would understand that a small amount (<about 20%, <about 15%, less than about 10%, less than about 5%, less than about 3%) of the second SCR can be present in a portion of the porous substrate.

FIG. 3 is a cross-sectional view of the wall flow monolith filter shown through plane A-A in FIG. 1, where the catalysts are located in the configuration shown in FIG. 2. The first subset of channels 5 is open at the first end face 15 of the wall flow monolith 1 and is sealed with a sealing material 20 at the second end face 25. A second subset of channels 10 is open at the second end face 25 of the wall flow monolith 1 and is sealed with a sealing material 20 at the first end face 15. The first end face 15 receives exhaust gas G from an engine. The exhaust gas G enters the monolith filter 1 at the open end of the first subset of channels 5. Gas passing down the first subset of channels 5 cannot exit the channel at the second end face 25 because the end is sealed 20. Gas G passes through the porous channel walls 35 and moves into the second subset of channels 10 and then exits the monolith filter at the second end face 25 which is connected to the exhaust system of the engine. When the gas G passes through the porous channel walls 45, soot can become trapped by or in the walls. The monolith filter comprises a first zone 35 that contains the first SCR catalyst 36 within the walls 45 of the monolith filter and extends from the first end face 15 a distance b towards the second end face 25. The monolith filter also comprises a second zone 40 that contains an ammonia oxidation catalyst 41 within the walls 35 and a coating comprising a second SCR catalyst 42 on the walls 45 of the monolith filter. The second zone 40 extends from the second end face 25 a distance c towards the first end face 15.

FIG. 4 is a schematic diagram showing the location of the two SCR catalysts and an ammonia oxidation catalyst in a configuration of the invention where the second SCR catalyst is present in a coating over the ammonia oxidation catalyst in the second zone and in a portion of the substrate in the second zone with a portion of the ammonia oxidation catalyst.

Figure 5:
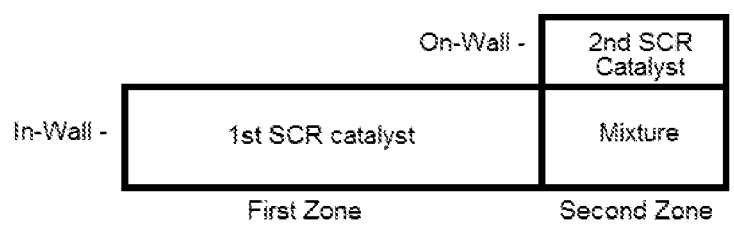
FIG. 5 is a schematic diagram showing the location of the two SCR catalysts and an ammonia oxidation catalyst in a configuration of the invention where the second SCR catalyst is present in a coating over the ammonia oxidation catalyst in the second zone and in all of the substrate in the second zone with all of the ammonia oxidation catalyst.

FIG. 5 is a schematic diagram showing the location of the two SCR catalysts and an ammonia oxidation catalyst in a configuration of the invention where the second SCR catalyst is present in a coating over the ammonia oxidation catalyst in the second zone and in all of the substrate in the second zone with all of the ammonia oxidation catalyst.

Figure 6:
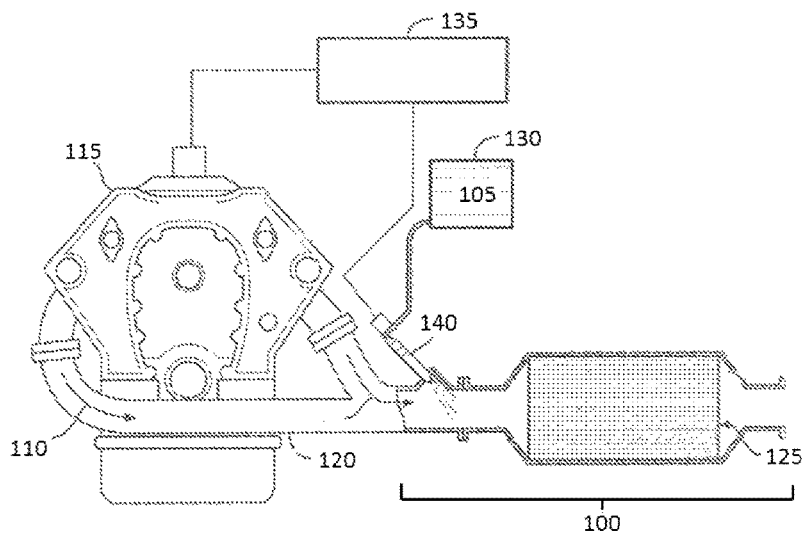
FIG. 6 is a schematic diagram of an exhaust gas treatment system for a diesel engine.
Figure 7:
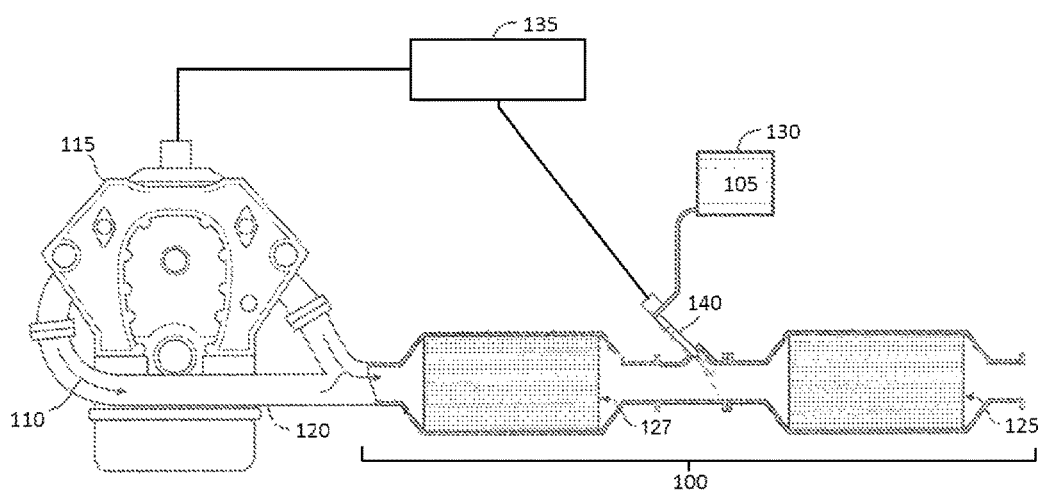
FIG. 7 is a schematic diagram of an exhaust gas treatment system for a diesel engine showing the locations of where the wall flow filter and other catalysts can be placed.

An exemplary exhaust gas treatment system 100 is shown in FIG. 6. Exhaust gas 110 produced in the engine 115 is passed through ducting 120 to the exhaust system 100. An ammonia reductant 105 is injected into the flow of exhaust gas 110 upstream of the wall flow filter of the first aspect of the invention 125. The ammonia reductant 105 is dispensed from a reservoir 130 as required (as determined by controller 135) through an injection nozzle 140 and mixes with the exhaust gas prior to reaching the monolith filter of the first aspect of the invention 125 which contains a first SCR catalyst in the first zone and the entrance of exhaust gas flow into the monolith. (FIG. 7)

The wall flow monolith 1 is preferably a single component. However, the monolith can be formed by adhering together a plurality of channels or by adhering together a plurality of smaller monoliths as described herein. Such techniques are well known in the art, as well as suitable casings and configurations of the emission treatment system.

The exhaust gas treatment system 100 can further comprise a catalyst 127 located before the monolith filter of the first aspect of the invention. The catalyst 127 located before the monolith filter of the first aspect of the invention is located in the exhaust system before the reductant 105 is added to the exhaust gas through the injector 140 upstream of the wall flow monolith 1 comprising a first SCR catalyst. The catalyst 127 located before the monolith filter of the first aspect of the invention is preferably a diesel oxidation catalyst (DOC), a NOx trap or a passive NOx adsorber (PNA).

EXAMPLES

Example 1. In-Wall Oxidation Catalyst

A filter with an ammonia oxidation catalyst in the wall of the filter was prepared on a SiC filter substrate (300 cpsi, 12 mil wall thickness) by first placing a washcoat comprising an oxidation catalyst comprising platinum on alumina over 10% of the length of the filter from one end. The Pt loading was 6 $g/ft^3$. The filter with washcoat comprising Pt on alumina was then dried and calcined for 1 hour at 500° C. An SCR layer was then placed on the filter over the 90% of the length of the filter that did not contain the ammonia oxidation catalyst by applying a washcoat comprising copper chabazite (Cu-CHA), alumina and a rheology modifier. A layer comprising the SCR washcoat was then placed over the ammonia oxidation catalyst. The loading of Cu-CHA was 1.71 $g/in^3$. The filter with the SCR washcoat was dried, then calcined at 500° C. for 1 hour. The filter was hydrothermally aged for 16 hours at 800° C.

Example 2. On-Wall Oxidation Catalyst

A filter with an ammonia oxidation catalyst on the wall of the filter was prepared on a SiC filter substrate (300 cpsi, 12 mil wall thickness) by first placing an SCR washcoat comprising copper chabazite (Cu-CHA), alumina and a rheology modifier on the filter to form an SCR layer. The loading of Cu-CHA was 1.71 g/in$^3$. The filter with the SCR washcoat was dried, then calcined at 500° C. for 1 hour. A layer of an oxidation catalyst over the SCR catalyst was formed by applying an oxidation washcoat comprising platinum on alumina over the SCR catalyst over 20% of the length of the filter from one end of the filter. The Pt loading was 3 g/ft$^3$. The filter with a layer of the oxidation catalyst over 20% of the length of the SCR catalyst was dried, then calcined at 500° C. for 1 hour. The filter was hydrothermally aged for 16 hours at 800° C.

Example 1 and 2 differed in the length of the oxidation coating, with the in-wall oxidation coating (Example 1) being over 10% of the length of the filter and the on-wall oxidation coating being over 20% of the length of the filter. However, the amount of Pt was the same in both Examples because the loading in the in-wall coating was 6 g/ft$^3$, while the loading in the on-wall coating was 3 g/ft$^3$.

Testing Methods and Conditions

Samples of Example 1 and 2 were tested on a car with a 3 l V6 engine. A diesel oxidation catalyst (DOC) was located before the samples of Examples 1 or 2. The vehicle was operated at an ammonia:NOx ratio (alpha) of 1.2. The load on the engine was adjusted to bring the inlet temperature of the filter to 610° C., then the inlet temperature was maintained at 610° C. for about 20 minutes. The load was then reduced and the temperature at the inlet decreased to 420° C. The inlet temperature was maintained at 420° C. for about 20 minutes. The load on the engine was reduced several times so that the inlet temperatures were maintained at the temperatures shown in the table below. While the temperatures were maintained at a steady state, measurements were made of the gas flow and various components in the exhaust, as shown below.

| Engine Out Values | | | | | |
| --- | --- | --- | --- | --- | --- |
| SCR Inlet Temp (° C.) | NO$_x$ (ppm) | NO$_2$:NO ratio | HC (ppm) | CO (ppm) | Airflow (kg/hr) |
| 610 | 455 | 4 | 1350 | 600 | 389 |
| 420 | 535 | 4 | 45 | 14 | 403 |
| 350 | 595 | 4 | 45 | 14 | 380 |
| 300 | 420 | 2 | 82 | 28 | 320 |
| 275 | 365 | 2 | 112 | 43 | 301 |
| 250 | 325 | 1 | 126 | 59 | 291 |
| 220 | 380 | 1 | 124 | 24 | 153 |

When the engine temperature was at about 600° C., filter regeneration occurred and hydrocarbon was introduced into the exhaust gas stream to remove soot from the filter. This is seen in the above table by the large amounts of hydrocarbons (HC) and carbon monoxide (CO) in the exhaust gas from the engine at 610° C.

Figure 8:
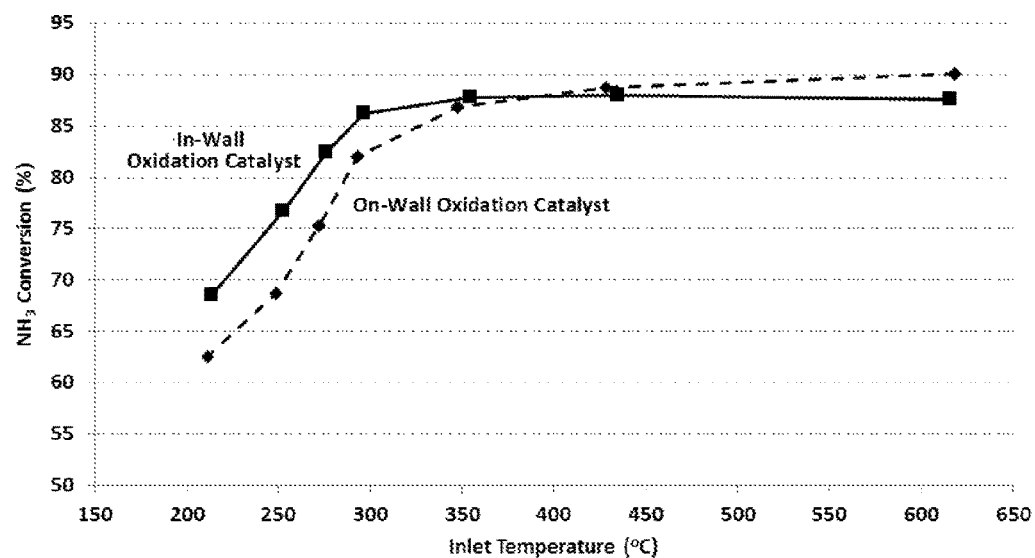
FIG. 8 is a graph showing the percent $NH_3$ conversion from in-wall versus on-wall placement of an oxidation catalyst over a temperature range of about 200 to about 625° C.

FIG. 8 shows that Example 1 (In-Wall Oxidation Catalyst) provided increased NH$_3$ conversion compared to Example 2 (On-Wall Oxidation Catalyst) at temperatures from about 200° C. to about 325° C. At temperatures from about 325° C. to about 425° C., both samples provided similar NH$_3$ conversion, while the amount of NH$_3$ conversion from the on-wall sample appears to increase at about 625° C.

Figure 9:
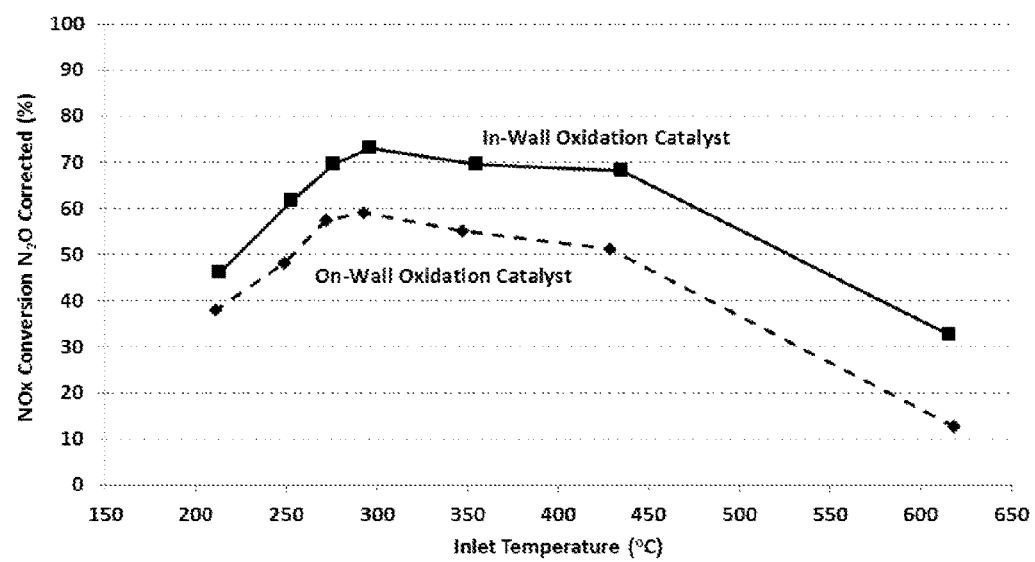
FIG. 9 is a graph showing the percent NOx conversion from in-wall versus on-wall placement of an oxidation catalyst over a temperature range of about 200 to about 625° C.

FIG. 9 shows that Example 1 (In-Wall Oxidation Catalyst) provided increased NOx conversion compared to Example 2 (On-Wall Oxidation Catalyst). At temperatures from about 200° C. to about 275° C., the sample with the in-wall oxidation catalyst converted about 10% more of the NOx than the sample with the on-wall oxidation catalyst. At temperatures from about 300° C. to about 625° C., the sample with the in-wall oxidation catalyst converted about 15-20% more of the NOx than the sample with the on-wall oxidation catalyst.

Figure 10:
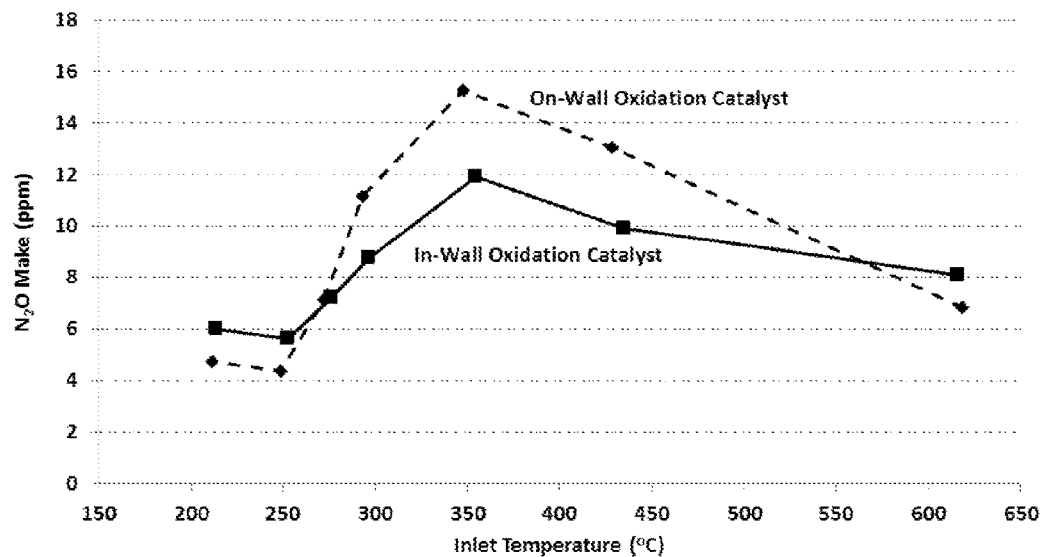
FIG. 10 is a graph showing the amount of $N_2O$ make from in-wall versus on-wall placement of an oxidation catalyst over a temperature range of about 200 to about 625° C.

FIG. 10 shows that Example 1 (In-Wall Oxidation Catalyst) provided less N$_2$O make compared to Example 2 (on-wall oxidation catalyst) at temperatures between about 275° C. and 550° C. At temperatures from about from about 200° C. to about 250° C., the sample with the in-wall oxidation catalyst provided only slightly more N$_2$O make than the sample with the on-wall oxidation catalyst.

Figure 11:
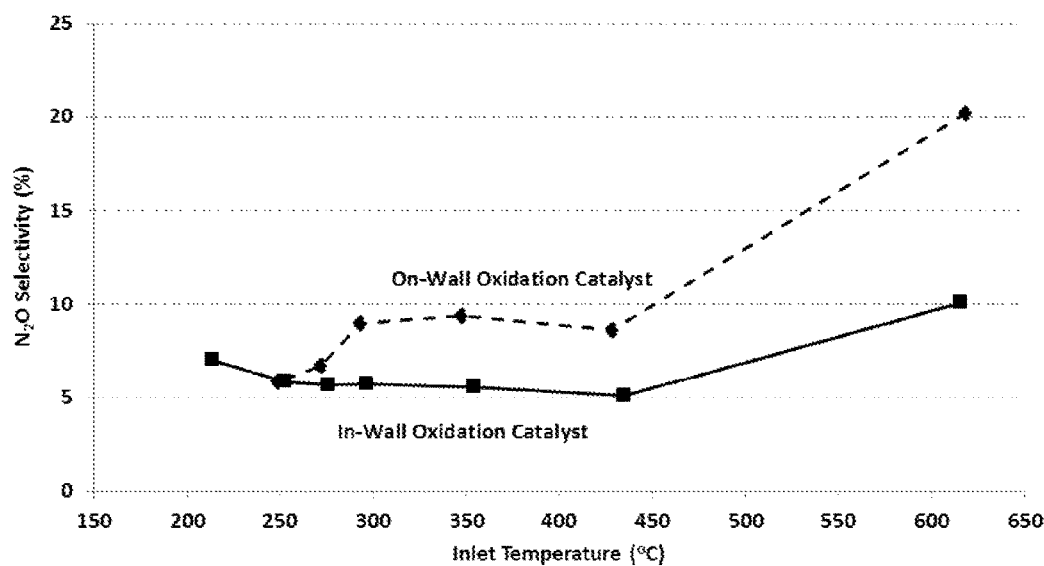
FIG. 11 is a graph showing $N_2O$ selectivity from in-wall versus on-wall placement of an oxidation catalyst over a temperature range of about 200 to about 625° C.

FIG. 11 shows that at temperatures from about from about 200° C. to about 250° C., Example 1 (In-Wall Oxidation Catalyst) provided the same N$_2$O selectivity as Example 2 (On-Wall Oxidation Catalyst). However, Example 1 (In-Wall Oxidation Catalyst) provided lower N$_2$O selectivity compared to Example 2 (On-Wall Oxidation Catalyst) at temperatures between about 275° C. and 550° C. Lower N$_2$O selectivity is desired because of the need to reduce N$_2$O formation.

It will be understood by those skilled in the art that variations to the composition and configurations of the catalytic wall-flow monolith filter and systems comprising the catalytic wall-flow monolith filter can be made thereto without departing from the scope of the invention or of the appended claims.

The invention claimed is:

1. A catalytic wall-flow monolith filter for use in an emission treatment system comprises a first end face, a second end face, a filter length defined by the distance from the first end face to the second end face, a longitudinal direction between the first end face and the second end face, and first and second pluralities of channels extending in the longitudinal direction,
    wherein the first plurality of channels is open at the first end face and closed at the second end face, and the second plurality of channels is open at the second end face and closed at the first end face,
    wherein the monolith filter comprises a porous substrate having surfaces that define the channels and having a first zone extending in the longitudinal direction from the first end face towards the second end face for a distance less than the filter length and a second zone extending in the longitudinal direction from the second end face towards the first end face and extending in the longitudinal direction for a distance less than the filter length,
    wherein the first zone comprises a first SCR catalyst distributed throughout the porous substrate, and the second zone comprises an ammonia oxidation catalyst distributed throughout the porous substrate and a second SCR catalyst located in a layer that covers the surfaces in the second zone of the porous substrate.

2. The catalytic wall-flow monolith filter according to claim 1, wherein the second SCR catalyst is present only in the layer that covers the surfaces of the porous substrate in the second zone.

3. The catalytic wall-flow monolith filter according to claim 1, wherein the second SCR catalyst is present in the layer that covers the surfaces of the porous substrate in the second zone and in all or a portion of the porous substrate in the second zone.

4. The catalytic wall-flow monolith filter according to claim 3, wherein the second SCR catalyst is present in the layer that covers the surfaces of the porous substrate in the second zone and in all of the porous substrate in the second zone.

5. The catalytic wall-flow monolith filter according to claim 3, wherein the second SCR catalyst is present in the layer that covers the surfaces in the second zone of the porous substrate and in a portion of the porous substrate in the second zone.

6. The catalytic wall-flow monolith filter according to claim 1, wherein in the first zone, the first SCR catalyst does not cover a surface of the first or second pluralities of channels.

7. The catalytic wall-flow monolith filter according to claim 1, wherein the first SCR catalyst is the same as the second SCR catalyst.

8. The catalytic wall-flow monolith filter according to claim 1, wherein the first SCR catalyst is different than the second SCR catalyst.

9. The catalytic wall-flow monolith filter according to claim 1, wherein at least one of the first SCR catalyst and the second SCR catalyst comprise a small-pore molecular sieve, a medium-pore molecular sieve, a large-pore molecular sieve, or a base metal.

10. The catalytic wall-flow monolith filter of claim 9, wherein the small pore molecular sieve has a framework structure independently selected from the group consisting of AEI, AFT, CHA, DDR, EAB, ERI, GIS, GOO, KFI, LEV, LTA, MER, PAU, VNI and YUG.

11. The catalytic wall-flow monolith filter of claim 9, wherein at least one of the first SCR catalyst and the second SCR catalyst comprises copper beta zeolite.

12. The catalytic wall-flow monolith filter according to claim 1, wherein at least one of the first SCR catalyst and the second SCR catalyst comprises $CeO_2$ impregnated with W, $CeZrO_2$ impregnated with W, or $ZrO_2$ impregnated with Fe and W.

13. A catalytic wall-flow monolith filter according to claim 1, wherein the first SCR catalyst comprises a small-pore molecular sieve having a framework structure selected from the group consisting of AEI, AFT, CHA, DDR, EAB, ERI, GIS, GOO, KFI, LEV, LTA, MER, PAU, VNI and YUG structural families.

14. A catalytic wall-flow monolith filter according to claim 1, wherein the second SCR catalyst is a large-pore molecular sieve or a non-zeolite material selected from $CeO_2$ impregnated with W, $CeZrO_2$ impregnated with W, and $ZrO_2$ impregnated with Fe and W.

15. A catalytic wall-flow monolith filter according to claim 1, wherein the ratio of a length of the second zone to a length of the first zone in the longitudinal direction is from 1:20 to 1:5.

16. A catalytic wall-flow monolith filter according to claim 1, wherein the second SCR catalyst is present at from about 10% to about 50% of the length of the monolith substrate.

17. A catalytic wall-flow monolith filter according to claim 1, wherein oxidation catalyst comprises a noble metal.

18. A catalytic wall-flow monolith filter according to claim 1, further comprising a third zone located between the first zone and the second zone, wherein the third zone comprises the first SCR catalyst distributed throughout the porous substrate and the second SCR catalyst located in a layer that covers the surface of the porous substrate and is not distributed throughout the porous substrate.

19. The catalytic wall-flow monolith filter according to claim 18, wherein the third zone has a length up to 10% of the length of the monolith substrate.

20. A catalytic wall-flow monolith filter according to claim 18, further comprising a gap between at least a portion of: (a) the first zone and the second zone; (b) the first zone and the third zone; or (c) the third zone and the second zone.

21. A catalytic wall-flow monolith filter according to claim 18, wherein there is no gap between at least a portion of: (a) the first zone and the second zone; (b) the first zone and the third zone; or (c) the third zone and the second zone.

22. An emission treatment system for treating a flow of a combustion exhaust gas, the system comprising the catalytic wall-flow monolith filter according to claim 1, wherein the first end face is upstream of the second end face.

23. A method for the manufacture of a catalytic wall-flow monolith filter of claim 1, the method comprising:
(a) providing a porous substrate having a first end face and a second end face defining a longitudinal direction therebetween and first and second pluralities of channels extending in the longitudinal direction, wherein the first plurality of channels is open at the first end face and closed at the second end face, and wherein the second plurality of channels is open at the second end face and closed at the first end face;
(b) forming a first zone by selectively infiltrating the porous substrate with a washcoat comprising the first SCR catalyst,
(c) forming the portion of the second zone comprising the ammonia oxidation catalyst by selectively infiltrating the porous substrate with a washcoat comprising an ammonia oxidation catalyst, and
(d) forming a coating of a second SCR catalyst over the ammonia oxidation catalyst in the second zone, where the walls of the second plurality of channels are covered by the coating,
wherein step (b) can be performed before step (c) or step (c) can be performed before step (b).

24. A method for treating a flow of a combustion exhaust gas comprising $NO_x$, the method comprising passing the exhaust stream through the monolith of claim 1, wherein the first end face is upstream of the second end face.

* * * * *